US008417295B2

(12) United States Patent
Fox

(10) Patent No.: US 8,417,295 B2

(45) Date of Patent: Apr. 9, 2013

(54) ANTENNA SYSTEM

(75) Inventor: Andrew Fox, Wiltshire (GB)

(73) Assignee: Deltenna Limited (GB)

(*) Notice: Subject to any disclaimer, the term of this patent is extended or adjusted under 35 U.S.C. 154(b) by 0 days.

(21) Appl. No.: 12/520,858

(22) PCT Filed: Dec. 21, 2007

(86) PCT No.: PCT/GB2007/004969

§ 371 (c)(1), (2), (4) Date: Aug. 17, 2009

(87) PCT Pub. No.: WO2008/078103

PCT Pub. Date: Jul. 3, 2008

(65) Prior Publication Data

US 2010/0029332 A1 Feb. 4, 2010

(30) Foreign Application Priority Data

Dec. 22, 2006 (GB) .................................. 0625909.7

(51) Int. Cl.
*H04M 1/00* (2006.01)

(52) U.S. Cl.
USPC ..................... 455/562.1; 455/553.1; 343/751; 342/359

(58) Field of Classification Search ............... 455/550.1, 455/552.1, 553.1, 561, 562.1; 343/751, 835; 342/359

See application file for complete search history.

(56) References Cited

U.S. PATENT DOCUMENTS

| | | | | |
|---|---|---|---|---|
| 6,101,399 | A | 8/2000 | Raleigh et al. | |
| 6,658,263 | B1 | 12/2003 | Ke | |
| 6,973,334 | B2 * | 12/2005 | Katagishi et al. | 455/571 |
| 7,330,500 | B2 * | 2/2008 | Kouki | 375/219 |
| 7,783,318 | B2 * | 8/2010 | Wilson et al. | 455/522 |
| 7,822,389 | B2 * | 10/2010 | Muhammad et al. | 455/78 |
| 8,005,513 | B2 * | 8/2011 | Risheq et al. | 455/571 |
| 2004/0252055 | A1 | 12/2004 | Thomas et al. | |
| 2005/0136875 | A1 | 6/2005 | Skarby | |

FOREIGN PATENT DOCUMENTS

| | | |
|---|---|---|
| GB | 2266998 | 11/1993 |
| GB | 2281176 | 2/1995 |
| GB | 2348755 A | 10/2000 |
| WO | 9495568 | 4/1994 |
| WO | 9921292 | 4/1999 |
| WO | 03047027 | 6/2003 |
| WO | 2004036785 | 4/2004 |
| WO | 2007111545 A1 | 10/2007 |

OTHER PUBLICATIONS

GB Search Report GB1122455.7; Dated Jan. 16, 2012.

Jinfan Zhang, et al., "Minimum System-Wide Mean-Squared Error for Downlink Spatial Multiplexing in Multiuser MIMO Channels", IEEE Globecom 2005, pp. 2690-2691.

GB Search Report GB0625909.7; Dated Jun. 25, 2008.

International Search Report PCT/GB2007/004696; Dated Jul. 7, 2008.

* cited by examiner

*Primary Examiner* — Nhan Le

(74) *Attorney, Agent, or Firm* — Cantor Colburn LLP

(57) ABSTRACT

An antenna system has multiple antenna elements, and multiple connection points allowing multiple users to connect to the antenna system. Each connection point is connected to each of the antenna elements through respective amplitude control circuitry, with the beam shape for each user being controlled by the amplitude control circuitry in the paths between that user's connection point and the antenna elements. The beam shapes for the different users are then independently controllable.

18 Claims, 6 Drawing Sheets

ANTENNA SYSTEM

This invention relates to an antenna system, and more particularly to an antenna system in which the beam pattern can be controlled.

Antenna systems are known, in which signals from multiple users can be combined, and transmitted from a single antenna. For example, in the case of a cellular mobile communications system, the base station combines signals for transmission from multiple sources, and the antenna transmits the combined signal.

Moreover, systems are known in which the shape of the beam transmitted from the antenna can be varied. That is, in an antenna system in which there are multiple antenna elements, it is possible to vary the power of the signals applied to the different antenna elements. The result is that the transmitted signal is not omnidirectional, but is instead preferentially transmitted in one or more direction, compared with one or more other direction.

It is also recognized that, in many situations, there are multiple radio networks providing cellular coverage. For example, one network operator may be providing multiple networks using different cellular technologies, or multiple operators may be providing competing services. In such situations, there can be a need for multiple antennas, but a proliferation of antennas can appear undesirable.

According to a first aspect of the present invention, there is provided an antenna system, comprising at least one antenna element, and having a plurality of connection points for signals for multiple users, and further comprising:

- respective separately controllable amplitude control circuitry elements connected to each of said connection points; and
- a junction element connected to each of said respective amplitude control circuitry elements and connected to said antenna element, such that the antenna system beam pattern can be controlled independently for said multiple users.

This has the advantage that the antenna system can be shared by multiple users, and the beam patterns can be controlled, so that each user is able to use a beam having a desired beam pattern.

Specifically, by adjusting the amplitudes of signals in the separate transmit and receive paths associated with different users, the effective shapes and/or sizes of the beams can be independently controlled in azimuth.

For a better understanding of the present invention, and to show how it may be put into effect, reference will now be made, by way of example, to the accompanying drawings, in which.

Figure 1:
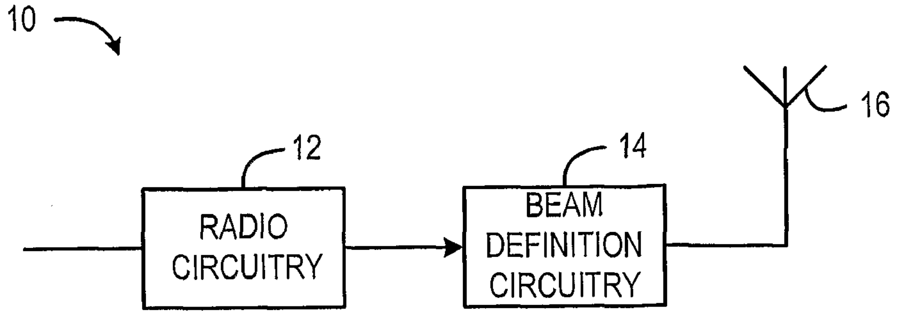
FIG. 1 is a block schematic diagram of a base station for a wireless communication system.

FIG. 1 is a block schematic diagram, illustrating the form of a base station 10 in a wireless communications system. The base station 10 includes radio circuitry 12, which is connected to beam definition circuitry 14, which in turn is connected to an antenna 16.

As is well known, the base station 10 communicates with users of suitable wireless communications devices, such as mobile phones or portable computers, provided that these are within the cell served by the base station 10. The radio circuitry 12 has a connection to the core network (not shown) of the wireless communications system, managed by the network operator, and generates radio frequency electrical signals for transmission by the antenna 16, and which receives the electrical signals produced from the radio signals received by the antenna 16.

The size of the cell served by the base station 10 depends on the amplitude of signals transmitted by the antenna 16, and the sensitivity of the antenna 16 and its associated electrical circuitry in detecting signals transmitted by the mobile users. In general terms, a network operator will wish to ensure that its network provides coverage throughout a service area, but it may do this by providing a large number of small cells, or a small number of larger cells, or, more typically, by a mixture of large cells combined with smaller cells in areas where most mobile users are expected to be found.

The shape of the cell served by the base station 10 may also desirably be varied. For example, where a base station is provided close to a highway carrying a large number of potential mobile users, it may be desirable for the cell to extend a relatively long distance along the highway, but only a relatively short distance to the sides of the highway. As another example, where a base station is provided at a corner of a region where there are expected to be a large number of mobile users, it may only be necessary for the shape of the cell to be such that it extends over that region.

Figure 2:
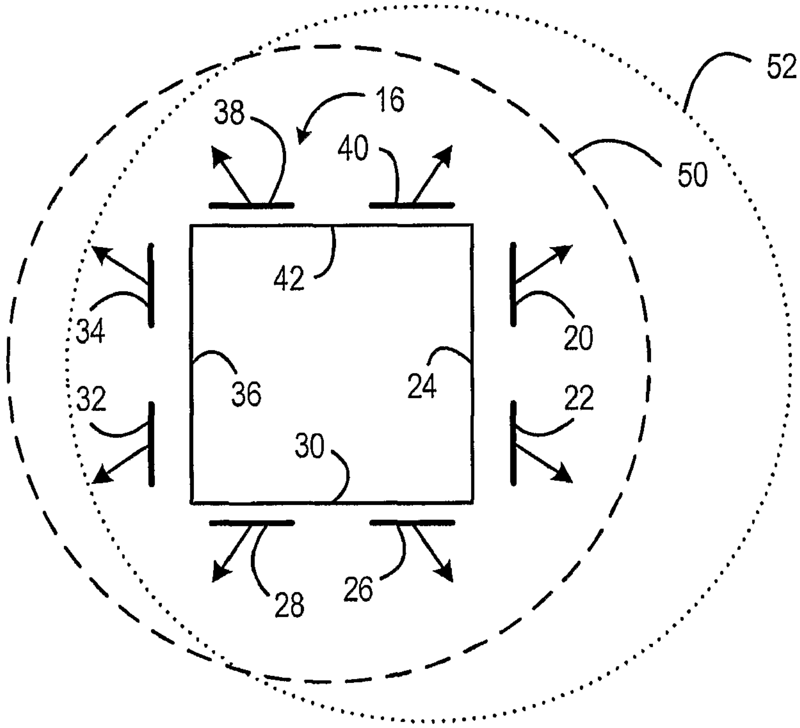
FIG. 2 illustrates the operation of an antenna in the base station of FIG. 1.

FIG. 2 is a schematic diagram illustrating a possible form for the antenna 16. As shown in FIG. 2, the antenna 16 is based on a rectangular tower 18, having two antenna elements 20, 22 on a first face 24 thereof, two antenna elements 26, 28 on a second face 30 thereof, two antenna elements 32, 34 on a third face 36 thereof, and two antenna elements 38, 40 on a fourth face thereof. Although they are described here as antenna elements, it will apparent to the person skilled in the art that each of these antenna elements can take the form of an array of individual antenna elements, if required, in order to provide desirable properties.

The antenna 16 thus has eight antenna elements in total. Each of these elements has a preferential direction of transmission and reception, indicated in FIG. 2 by the respective arrows extending outwards from the elements.

It can be seen that, when signals transmitted from these antenna elements have equal amplitudes, and when the antenna elements are equally sensitive to received signals, the antenna 16 is essentially omnidirectional. That is, the beam pattern, indicated by the dashed line 50, is generally circular. However, when signals transmitted from the antenna elements have unequal amplitudes, and when the antenna elements are not equally sensitive to received signals, the beam pattern changes. For example, the asymmetrical beam pattern indicated by the dotted line 52 is obtained when the signals transmitted from the antenna elements 20, 22 on the first face 24 have larger amplitudes than the signals transmitted from the antenna elements 32, 34 on the third face 36, and when the antenna elements 20, 22 on the first face 24 are more sensitive to received signals than the antenna elements 32, 34 on the third face 36.

In accordance with an aspect of the invention, the beam pattern is controlled by the beam definition circuitry 14, as described in more detail below.

In accordance with an aspect of the invention, the base station is suitable for use by more than one network operator, and/or allows a single network operator to provide distinct services. More specifically, aspects of the invention allow control of the beam pattern such that these different operator users see different beam patterns.

Figure 3:
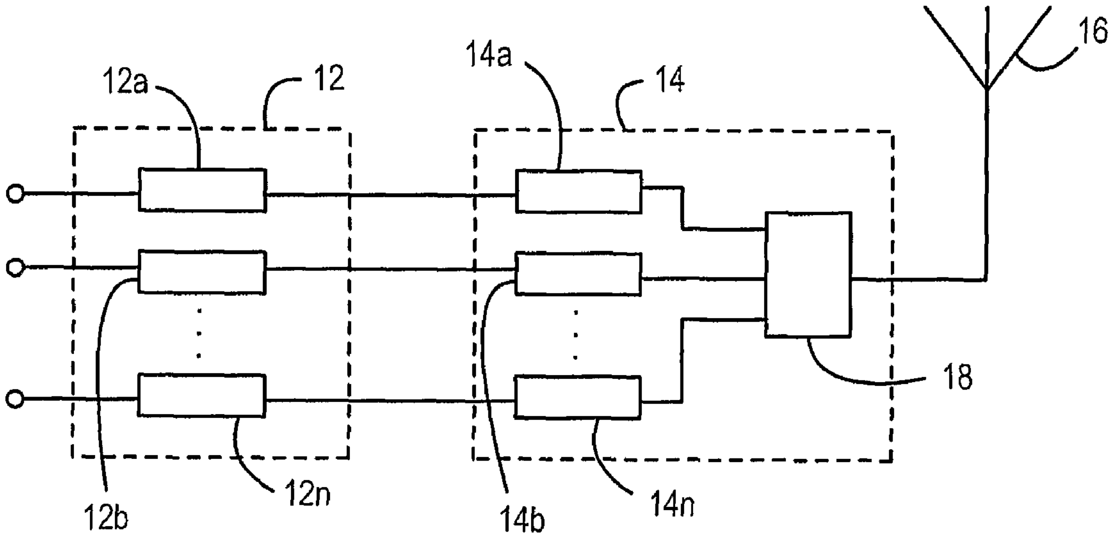
FIG. 3 shows in more detail the base station of FIG. 1.

FIG. 3 shows in more detail the form of the base station 10 that provides this function. The radio circuitry 12 comprises separate radio circuitry 12*a*, 12*b*, . . . , 12*n* for each of the operator users. As mentioned above, the operator users may for example be competitor network operators, or they may be different technologies under the control of a particular network operator. Thus, for example, the base station 10 may be used by two competing network operators on a site-sharing basis to provide their cellular telephone services. Alternatively, for example, the base station 10 may be used by one network operator to provide both a GSM cellular telephone service and a UMTS cellular telephone service. As another example, the base station 10 may be used by one network operator to provide a cellular telephone service, and used by another operator to provide a different wireless access service, for example based on Wi-Fi, WiMAX, or a similar technology. Three operator users are shown in FIG. 3, but it will be appreciated that there may be any number of such users. In each case, the relevant operator user provides the relevant circuitry to convert received signals into radio frequency signals that are suitable for transmission by the antenna system, and to convert radio frequency wireless signals received over the air interface by the antenna system into signals that can be handled by conventional signal processing circuitry (not shown).

The signals for transmission generated by the radio circuitry 12*a*, 12*b*, . . . , 12*n* are then passed to respective beam definition circuitry 14*a*, 14*b*, . . . , 14*n*, which will be described in more detail below. The beam definition circuitry blocks 14*a*, 14*b*, . . . , 14*n* are connected through a junction element 18 to the antenna 16. Similarly, received signals are passed through the junction element 18 to the beam definition circuitry blocks 14*a*, 14*b*, . . . , 14*n*, and then to the radio circuitry 12*a*, 12*b*, . . . , 12*n*.

As mentioned above, it is desirable to be able to control the size and/or shape of the area served by the base station 10. Moreover, where the base station 10 is being used by different operator users, as described above, it is desirable to be able to control independently the sizes and/or shapes of the areas served by the base station 10 on behalf of these different operator users.

For example, one network operator may wish to use the base station 10 to provide coverage over a relatively large area because it does not have any other nearby base stations, while a second operator may wish to use the base station to provide coverage over a smaller area because it already has nearby base stations, while a third operator may wish to use the base station only to provide coverage in one particular direction from the base station.

As another example, a network operator may wish to increase its network capacity by dividing the area around the base station into two or more cells. In that case, separate radio circuitry can be provided for the traffic for each of those cells, and these can be regarded as different users for the purposes of this description.

Figure 4:
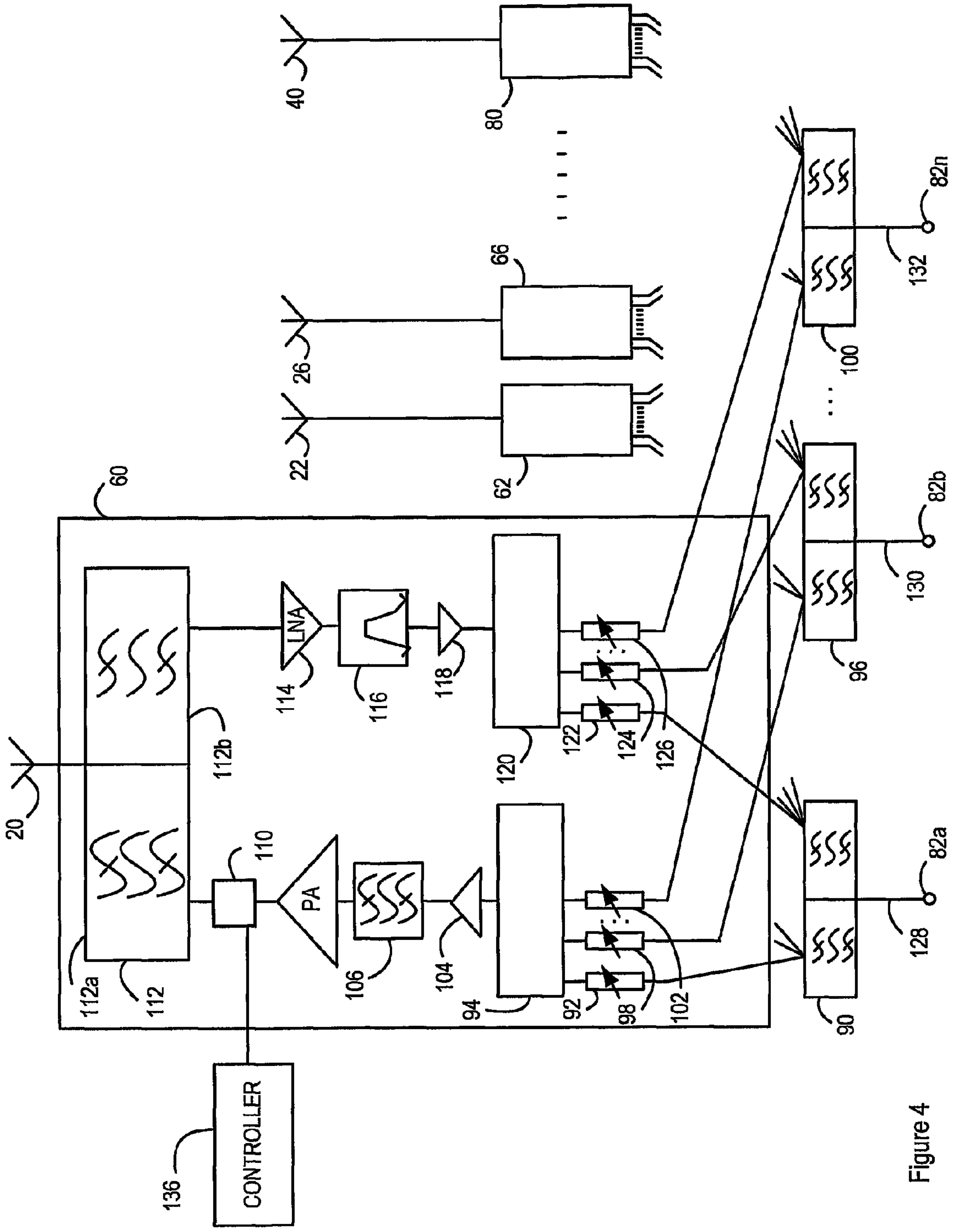
FIG. 4 shows in more detail a part of the beam definition circuitry in one embodiment of the system of FIG. 1.

FIG. 4 illustrates the form of the beam direction circuitry 14 that can be provided to allow independent control of the sizes and/or shapes of the areas served by the base station 10 on behalf of these different operator users, also referred to as the beam patterns.

Specifically, the beam definition circuitry 14 includes first amplitude control circuitry 60 in a signal path connected to the first antenna element 20, second amplitude control circuitry 62 in a signal path connected to the second antenna element 22, third amplitude control circuitry 66 in a signal path connected to the third antenna element 26, and so on, up to eighth amplitude control circuitry 80 in a signal path connected to the eighth antenna element 40. Thus, in this embodiment, there is separate amplitude control circuitry in the signal path of each antenna element, although it will be appreciated that the same amplitude control circuitry may be located in the signal paths of more than one antenna element where this provides the required amount of beam definition.

It will be noted that a beam-forming network, such as a Butler matrix (not shown) may also advantageously be connected between the amplitude control circuitry blocks 60, 62, 66, . . . , 80 and the antenna elements 20, 22, 26, . . . , 40.

In accordance with this embodiment of the invention, there are separate operator user paths within the signal path for each antenna element.

Thus, the transmit signals for a first user, or group of users, are applied from the first radio circuitry block 12*a* of the radio circuitry 12 to a first connection point 82*a*, and then to a first user duplexer, or diplexer, 90. These transmit signals are then applied to a variable gain element, preferably in the form of a variable attenuator 92. The attenuated signals are applied to a high isolation combiner, preferably in the form of a Wilkinson structure 94.

At the same time, the transmit signals for a second user, or group of users, are applied from the second radio circuitry block 12*b* of the radio circuitry 12 to a second connection point 82*b*, and then to a second user duplexer 96. These transmit signals are then applied to a variable gain element, preferably in the form of a variable attenuator 98. The attenuated signals are also applied to the high isolation combiner 94. Further, the transmit signals for another user, or group of users, are applied from the relevant radio circuitry block 12*n* of the radio circuitry 12 to a respective user duplexer 100. These transmit signals are then applied to a variable gain element, preferably in the form of a variable attenuator 102. The attenuated signals are also applied to the high isolation combiner 94. Any convenient number of user duplexers can be provided, depending on the required number of users, or groups of users, for which distinct beam patterns are required. Each of these user duplexers can be connected through a respective variable gain element to the combiner 94.

The combined signals output from the combiner 94 are applied to a driver amplifier 104, although this may be omitted in other embodiments of the invention, and then to a suitable band-pass filter 106, and then to a power amplifier 108. The amplified signals are passed through a switching element 110 to an input of a further duplexer 112. The output signal is then applied to the relevant antenna element 20.

In the case of signals received by the first antenna element 20 of the antenna 16, these received signals are passed to the duplexer 112, and the received signals are then applied to a low noise amplifier 114. The amplified signals are passed through a suitable band-pass filter 116 to an optional further amplifier 118, and then to a high isolation splitter, preferably in the form of a Wilkinson structure 120.

The illustrated structure can be used in the case of a frequency division duplex (FDD) system, where the duplexer 112 is used to provide isolation between the transmit and receive paths. However, any suitable mechanism can be used to provide the isolation between the transmit and receive paths. For example, in the case of a time division duplex (TDD) system, the isolation can be provided by means of a switch, which passes signals from the transmit path to the antenna, or from the antenna to the receive path, as required.

In one embodiment, the splitter simply passes a proportion of its input signal to each of its outputs, and these proportions may be equal. In another embodiment, the splitter can be frequency selective, in which case it can pass components of the received signal in different frequency bands to different outputs.

A first component of the signal is passed to a first variable attenuator 122, a second component of the signal is passed to a second variable attenuator 124, a third component of the signal is passed to a third variable attenuator 126, and so on.

The signals from the first variable attenuator 122 are then passed to the receive side of the first operator user duplexer 90, and then to the connection point 82*a* for the radio circuitry block of the first operator user; the signals from the second variable attenuator 124 are then passed to the receive side of the second user duplexer 96, and then to the connection point 82*b* for the radio circuitry block of the second user; the signals from the further variable attenuator 126 are passed to the receive side of the further user duplexer 100, and then to the connection point 82*c* for the radio circuitry block of the further user; and so on.

Transmit signals from the first operator user or group of users, and receive signals for the first operator user or group of users are preferably combined on a single cable 128. Similarly, transmit signals from the second user or group of users, and receive signals for the second user or group of users are preferably combined on a single cable 130, and transmit signals from the further user or group of users, and receive signals for the further user or group of users are preferably combined on a single cable 132, and so on.

In normal use of the antenna system, the switch 110 passes the transmit signals from the power amplifier 108 to the transmit side 112*a* of the duplexer 112, which is therefore adapted to pass signals at the relevant transmit frequency. By contrast, the receive side 112*b* of the duplexer 112 is adapted to pass signals at the relevant receive frequency.

In a signal detection mode, the switch 110, which may for example take the form of a coupler or a circulator, passes received signals from the antenna element 20, which are at the relevant transmit frequency and therefore pass through the transmit side 112*a* of the duplexer 112, to a controller 136.

The amplitude control circuitry blocks 62, 66, . . . , 80 in the signal paths connected to the other antenna elements 22, 26, . . . , 40 are substantially the same as the first amplitude control circuitry block 60 in the signal path connected to the first antenna element 20. Thus, the transmit sides of each of the user duplexers 90, 96, . . . , 100, have respective connections into respective variable attenuators in the transmit paths of each of the amplitude circuitry blocks, while other variable attenuators in the receive paths of each of the amplitude circuitry blocks each have connections into the receive sides of each of the user duplexers 90, 96, . . . , 100.

As discussed above, the amounts of attenuation in the transmit and receive signal paths for the antenna elements of an antenna system determine the beam shape for the antenna as a whole. As described here, the amounts of attenuation in the antenna element transmit and receive signal paths for one operator user or group of users can all be controlled independently such that they are different from the amounts of attenuation in the antenna element transmit and receive signal paths for one or more other operator user or groups of users. Thus, these users or groups of users effectively see different beam shapes for the antenna as a whole.

Figure 5:
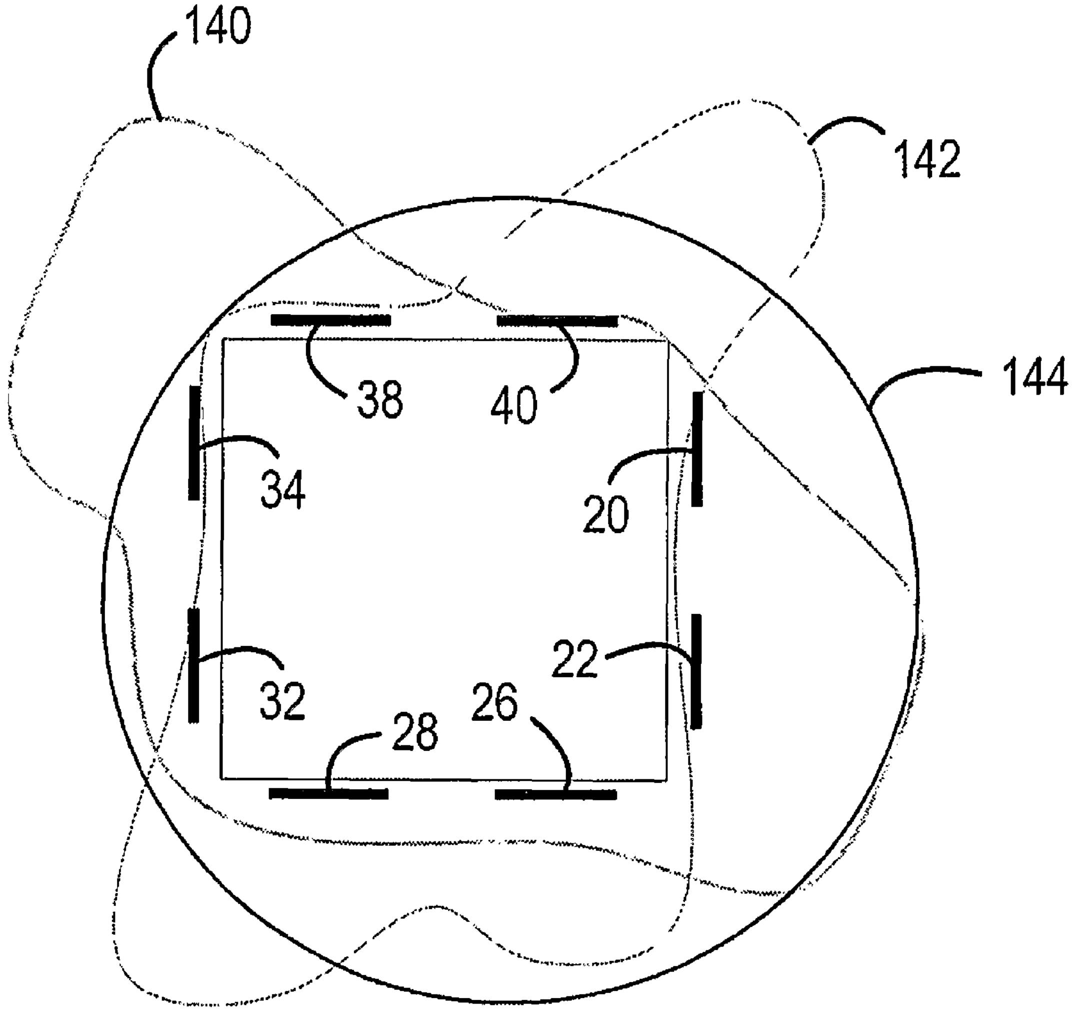
FIG. 5 illustrates the operation of an antenna in use of the beam definition circuitry of FIG. 4.

This is illustrated in FIG. 5, which shows the beam shape 140 for a first user, the beam shape 142 for a second user, and the beam shape 144 for a third user, it being appreciated that there may be as many different beam shapes for different users or groups of users as there are user duplexers 90, 96, 100.

Thus, for example, the signal paths for the first user may have more attenuation in the signal paths to and from the first antenna element 20, the third antenna element 26, the fourth antenna element 28, the fifth antenna element 32, and the eighth antenna element 40, but less attenuation in the signal paths to and from the second antenna element 22, the sixth antenna element 34 and the seventh antenna element 38. At the same time, the signal paths for the second user may have more attenuation in the signal paths to and from the first antenna element 20, the second antenna element 22, the fifth antenna element 32, the sixth antenna element 34, and the seventh antenna element 38 but less attenuation in the signal paths to and from the third antenna element 26, the fourth antenna element 28, and the eighth antenna element 40. Also at the same time, the signal paths for the third user may have substantially equal amounts of attenuation in the signal paths to and from all antenna elements, producing a substantially omnidirectional beam.

The azimuth beam patterns for the different operator users can therefore be controlled independently.

One further example of the use of the base station 10 is to allow an operator to provide a multiple-input multiple-output (MIMO) service. That is, on the transmit side, a data stream is divided into a number of lower bit rate data streams, and each one of these lower bit rate data streams is applied to a respective one of the connection points 82*a*, 82*b*, 82*c*. By suitable control of the gain control elements in the paths between these connection points and the antenna elements, each of the lower bit rate data streams can be transmitted with a different beam shape. By taking advantage of multipaths, these data streams can be received by a receiver antenna from different directions, allowing them to be separated in the receiver. Similarly, on the receive side, the gain control elements can be adjusted so that the received signals supplied as outputs to the connection points 82*a*, 82*b*, 82*c* have arrived from different directions, and so the antenna 16 can effectively function as multiple receive antennas in a MIMO system.

In one embodiment of the invention, the beam patterns can be controlled on the basis of signal strength measurements made by the controller 136. That is, on initialization of the system, or periodically during use, the controller 136 can control the switch 110 so that signals from other transmitters at the transmit frequencies are detected by the controller 136. For this purpose, the controller 136 can for example include an integrated circuit that is usually found in mobile communications handsets in use in the system.

The required beam pattern, or patterns, can then be controlled on the basis of such measurements.

It will be noted that, as described so far, it is assumed that the amounts of attenuation in the transmit and receive paths for one particular user to one particular antenna element will be substantially equal, such that the transmit and receive beam patterns are substantially equal. However, it will be appreciated that this need not be the case, and that the amounts of attenuation in corresponding transmit and receive paths can be adjusted so that the transmit and receive beam patterns are not equal.

One particular application of the present invention allows the same antenna elements to be used for cellular wireless communication using two different communication technologies or two different telecommunications standards.

Figure 6:
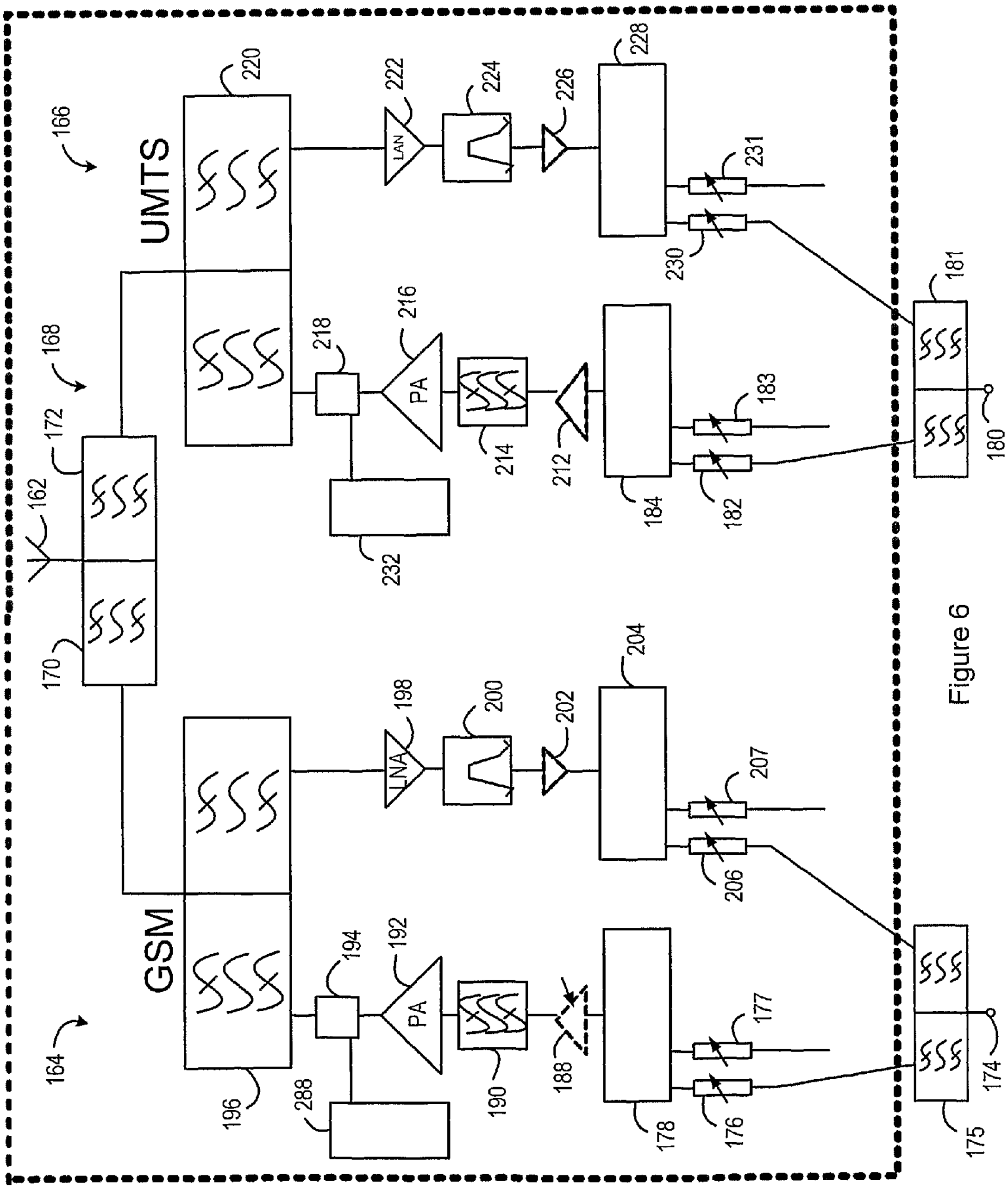
FIG. 6 shows in more detail a part of the beam definition circuitry in another embodiment of the system of FIG. 1.

FIG. 6 shows a system for use in such an application. More specifically, FIG. 6 shows the form of amplitude control circuitry 160 in the signal paths to and from an antenna element 162. As before, any number of similar amplitude control circuitry blocks may be provided in the signal paths to and from each of the antenna elements making up the antenna. In this case, the antenna element 162 may be a single omnidirectional, or sectorized, antenna, in which case only one such amplitude control circuitry block may be required.

In this illustrated example, the antenna element has one pair of transmit and receive paths 164 for use in a GSM cellular communications network, and another pair of transmit and receive paths 166 for use in a UMTS cellular communications network, although the invention may be applied to any system involving different modulation schemes or standards. Thus, in this case, the antenna element 162 is a wideband antenna element or array, able to handle signals at GSM and UMTS frequencies.

The antenna element 162 is connected to a suitable splitting and combining device 168, which may for example be a duplexer or a diplexer, with a first side 170 connected to the GSM transmit and receive paths 164 passing signals in the GSM frequency band of 1710 MHz to 1850 MHz, and with a second side 172 connected to the UMTS transmit and receive paths 166 passing signals in the UMTS frequency band of 1920 MHz to 2170 MHz.

Each of the transmit and receive path pairs 164, 166 then generally corresponds to the amplitude control circuitry block 60 described in detail with reference to FIG. 3.

That is, in the GSM transmit and receive paths 164, the transmit signals for the GSM operator user, or group of users, are applied from the radio circuitry through a first user connection point 174 to a first user duplexer 175. These transmit signals are then applied to a variable gain element, preferably in the form of a variable attenuator 176. Connection points and user duplexers (not shown) may also be provided for other GSM operator users, with corresponding variable gain elements 177, etc. In this case, the attenuated signals are applied to a high isolation combiner, preferably in the form of a Wilkinson structure 178.

The combined signals output from the combiner 178 are applied to a driver amplifier 188, and then to a suitable band-pass filter 190, and then to a power amplifier 192. The amplified signals are passed through a switching element 194 to a transmit side of a GSM duplexer 196. The output signal is then applied to the GSM side 170 of the duplexer 168, and to the relevant antenna element 162.

In the case of GSM signals received by the antenna element 162, these received signals are passed through the duplexer 168 to the duplexer 196, and the received signals are then applied to a low noise amplifier 198. The amplified signals are passed through a suitable band-pass filter 200 to an optional further amplifier 202, and then to a high isolation splitter, preferably in the form of a Wilkinson structure 204.

The signals are passed to a first variable attenuator 206, and then to the receive side of the first user duplexer 175, for the first GSM user. The signals can also be passed to one or more further variable attenuator 207, and then to an associated user duplexer (not shown) and to the relevant radio circuitry.

The switch 194 generally passes the transmit signals from the power amplifier 192 to the duplexer 196, but may be controlled to pass received signals from the antenna element 160, which are at the relevant transmit frequency, to a controller 208.

Similarly, in the UMTS transmit and receive paths 166, the transmit signals for the first UMTS operator user, or group of users, are applied from the radio circuitry through a first UMTS user connection point 180 to a first UMTS user duplexer 181. These transmit signals are then applied to a variable gain element, preferably in the form of a variable attenuator 182. Connection points and user duplexers (not shown) may also be provided for other UMTS operator users, with corresponding variable gain elements 183, etc. In this case, the attenuated signals are applied to second high isolation combiner 184.

The combined signals output from the combiner 184 are applied to a driver amplifier 212, and then to a suitable band-pass filter 214, and then to a power amplifier 216. The amplified signals are passed through a switching element 218 to a transmit side of a UMTS duplexer 220. The output signal is then applied to the UMTS side 172 of the duplexer 168, and to the relevant antenna element 162.

In the case of UMTS signals received by the antenna element 162, these received signals are passed through the duplexer 168 to the duplexer 220, and the received signals are then applied to a low noise amplifier 222. The amplified signals are passed through a suitable band-pass filter 224 to an optional further amplifier 226, and then to a high isolation splitter, preferably in the form of a Wilkinson structure 228.

The signals are passed to a first variable attenuator 230, and then to the receive side of the first UMTS user duplexer 181, for the first UMTS user. The signals can also be passed to one or more further variable attenuator 231, and then to an associated user duplexer (not shown) and to the relevant radio circuitry, for any other UMTS users.

The switch 218 generally passes the transmit signals from the power amplifier 216 to the duplexer 220, but may be controlled to pass received signals from the antenna element 162, which are at the relevant transmit frequency, to a controller 232, which may be associated with the controller 208.

The first group of UMTS operator users may be the same as the first group of GSM operator users, and so on for the other groups, or the first group of UMTS users may be completely unrelated to the first group of GSM users.

Thus, in the GSM and UMTS paths, any convenient number of variable gain elements can be provided, depending on the required number of users, or groups of users, for which distinct beam patterns are required. In this case, there may be only one such group of users in each case, and the system may simply provide one beam pattern for all GSM users, and one beam pattern for all UMTS users, or, of course, the number of distinct GSM beam patterns may be different from the number of distinct UMTS beam patterns.

As illustrated in FIG. 6, there is a single antenna element 162, which may be directional or omnidirectional, and so the control of the attenuation in the relevant signal paths only determines the sizes of the beams, rather then their shapes. However, as shown in FIG. 4, separate beam definition circuitry can be provided in the signal paths to multiple antenna elements making up an antenna, allowing the shapes of the beam patterns also to be controlled.

Figure 7:
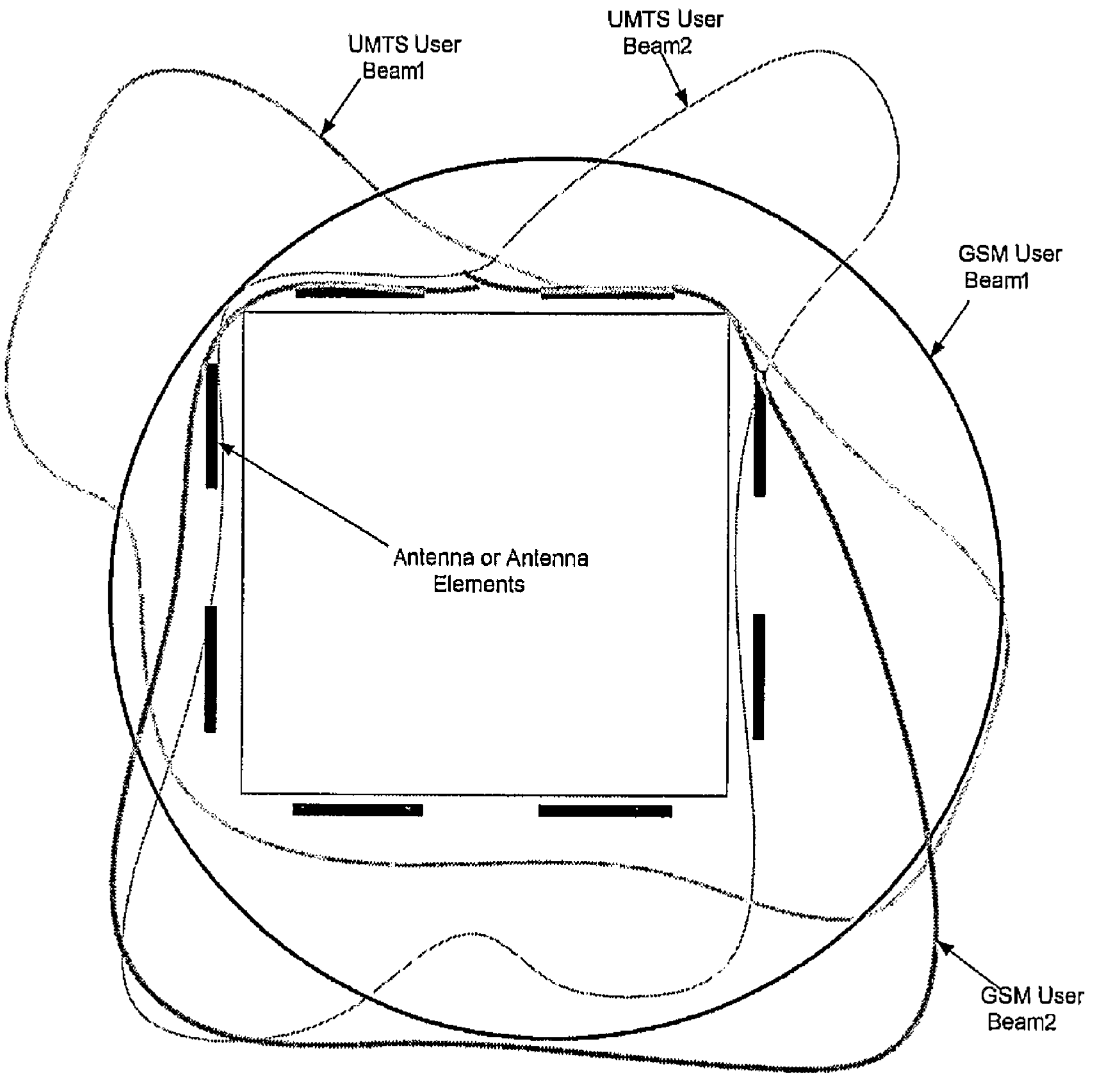
FIG. 7 illustrates the operation of an antenna in use of the beam definition circuitry of FIG. 6.

Thus, this system allows individual control of the degrees of attenuation in the signal paths to and from different antenna elements, for different users or groups of users. FIG. 7 illustrates one possible result of this. Thus, there are different beam patterns for a first group of GSM users, a second group of GSM users, a first group of UMTS users, and a second group of UMTS users.

There is thus disclosed a system which allows the same antenna element or elements to be used for different communication systems, while controlling the antenna beam patterns differently in those two systems, and/or allows the same antenna element or elements to provide different antenna beam patterns for different users or groups of users in a communication system.

The invention claimed is:

1. A base station, comprising:

first radio circuitry;

a first user duplexer, connected to the first radio circuitry;

second radio circuitry;

a second user duplexer, connected to the second radio circuitry;

an antenna element;

a first controllable amplitude control circuitry element connected to a transmit side of the first user duplexer in a first transmit path of the antenna element;

a second controllable amplitude control circuitry element connected to a receive side of the first user duplexer in a first receive path of the antenna element;

a third controllable amplitude control circuitry element connected to a transmit side of the second user duplexer in a second transmit path of the antenna element; a fourth controllable amplitude control circuitry element connected to a receive side of the second user duplexer in a second receive path of the antenna element; a first junction element combining the first and second transmit paths to form a combined transmit path of the antenna element; and a second junction element combining the first and second receive paths to form a combined receive path of the antenna element.

2. The base station as claimed in claim 1, comprising a power amplifier in said combined transmit path.

3. The base station as claimed in claim 1, comprising an amplifier in said combined receive path.

4. The base station as claimed in claim 1, comprising a plurality of said antenna elements, and comprising:

a respective first controllable amplitude control circuitry element connected to a transmit side of the first user duplexer in a first transmit path of each antenna element; a respective second controllable amplitude control circuitry element connected to a receive side of the first user duplexer in a first receive path of each antenna element; a respective third controllable amplitude control circuitry element connected to a transmit side of the second user duplexer in a second transmit path of each antenna element;

a respective fourth controllable amplitude control circuitry element connected to a receive side of the second user duplexer in a second receive path of each antenna element;

a respective first junction element combining the first and second transmit paths to form a combined transmit path of each antenna element; and a respective second junction element combining the first and second receive paths to form a combined receive path of each antenna element.

5. The base station as claimed in claim 4, wherein said first radio circuitry and said second radio circuitry operate according to different wireless technologies.

6. The base station as claimed in claim 4, wherein said first radio circuitry and said second radio circuitry operate according to the same wireless technology.

7. The base station as claimed in claim 1, wherein at least one of said first radio circuitry and said second radio circuitry operates according to a cellular wireless technology.

8. The base station as claimed in claim 1, wherein said first radio circuitry and said second radio circuitry operate according to different wireless technologies.

9. The base station as claimed in claim 1, wherein said first radio circuitry and said second radio circuitry operate according to the same wireless technology.

10. The base station as claimed in claim 1, wherein at least one of said first radio circuitry and said second radio circuitry operates according to a cellular wireless technology.

11. The base station as claimed in claim 10, wherein at least one of said first radio circuitry and said second radio circuitry operates according to a GSM cellular wireless technology.

12. The base station as claimed in claim 10, wherein at least one of said first radio circuitry and said second radio circuitry operates according to a UMTS cellular wireless technology.

13. The base station as claimed in claim 1, wherein at least one of said first radio circuitry and said second radio circuitry operates according to a non-cellular wireless technology.

14. The base station as claimed in claim 13, wherein at least one of said first radio circuitry and said second radio circuitry operates according to a Wi-Fi wireless technology.

15. The base station as claimed in claim 13, wherein at least one of said first radio circuitry and said second radio circuitry operates according to a WiMAX wireless technology.

16. The base station as claimed in claim 1, wherein said first radio circuitry and said second radio circuitry operate in the same frequency band.

17. The base station as claimed in claim 1, wherein said first radio circuitry and said second radio circuitry operate in different frequency bands.

18. The base station as claimed in claim 1, wherein the first radio circuitry and the second radio circuitry generate first and second data streams respectively for MIMO transmission.

* * * * *